No. 615,182. Patented Nov. 29, 1898.
H. HYDE & J. BUCKLEY.
DRINKING FOUNTAIN.
(Application filed Nov. 26, 1897.)
(No Model.)
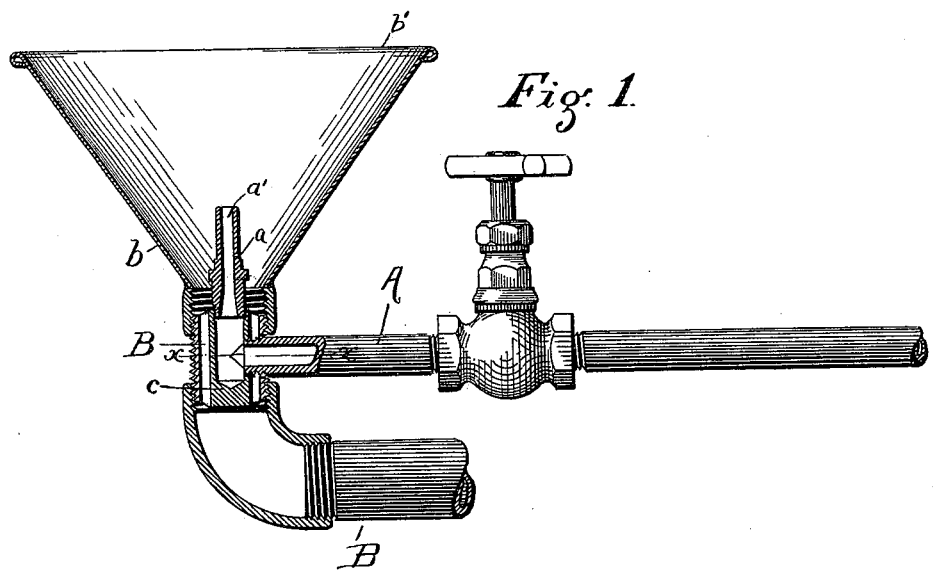
Fig. 1.
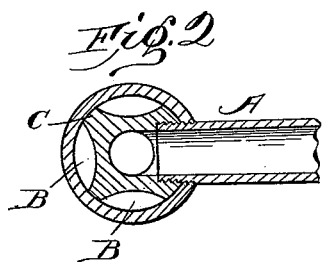
Witnesses.
Chas Logan
G. Willard Rich.
Inventors
Hampden Hyde
John Buckley
by Church & Church
their Attorneys
THE NORRIS PETERS CO., PHOTO-LITHO., WASHINGTON, D. C.

UNITED STATES PATENT OFFICE.

HAMPDEN HYDE AND JOHN BUCKLEY, OF ROCHESTER, NEW YORK, ASSIGNORS TO THE HYDE FOUNTAIN COMPANY, OF SAME PLACE.

DRINKING-FOUNTAIN.

SPECIFICATION forming part of Letters Patent No. 615,182, dated November 29, 1898.

Application filed November 26, 1897. Serial No. 659,863. (No model.)

*To all whom it may concern:*

Be it known that we, HAMPDEN HYDE and JOHN BUCKLEY, of Rochester, in the county of Monroe and State of New York, have invented certain new and useful Improvements in Drinking-Fountains; and we do hereby declare the following to be a full, clear, and exact description of the same, reference being had to the accompanying drawings, forming a part of this specification, and to the reference-letters marked thereon.

Our invention relates to drinking-fountains, and has for its object to provide a device that is thoroughly sanitary and so constructed that there is no possibility of contamination of the user's lips or of the water; and to these ends it consists in the improvements hereinafter fully described, the novel features being particularly pointed out in the claims at the end of this specification.

Heretofore attempts have been made to provide a so-called "sanitary" drinking-fountain, from which a draft of water may be obtained without the use of a cup; but in all of such devices with which we are familiar the user is required to apply his lips to a part to which others, possibly those having a communicable disease, have applied theirs, or else the water obtained flows through and over a stationary cup larger than the water-inlet pipe, which cup may contain decaying vegetable or animal matter or other disagreeable or deleterious substances. Our invention, however, contemplates the provision of an upwardly-rising jet of water in a position convenient to permit the person to bend his head over and allow the flowing water, fresh and pure from the induction-conduit, to enter his mouth without passing through any cup or receptacle liable to contain germs or any contaminating substance, and it further contemplates the protection of the jet-orifice from the contact of the person's lips and the provision of means for the escape and removal of water falling from the jet.

In the accompanying drawings, Figure 1 is a longitudinal sectional view of a drinking-fountain embodying our improvements; and Fig. 2, a cross-sectional view of the same, taken on the line $x\ x$ of Fig. 1.

Similar reference-letters indicate similar parts.

In the present embodiment of our invention we have shown a simple form of our improved fountain, embodying an induction-conduit A, connected to a suitable water-supply and having a jet-pipe $a$, with substantially vertical external walls, and the vertical jet-orifice $a'$, said jet-pipe being connected with a bridge-piece $c$ and arranged within a bowl $b$, having a flaring upper portion and forming the entrance end of an unobstructed and freely-discharging eduction-conduit B, adapted to carry off the waste water. The jet-orifice is arranged some distance above the bottom of the bowl, and the relative capacities of the jet-pipe and the eduction-conduit B are such that the water in the bowl can never rise above the jet-orifice, and the upper portion of the bowl extends far enough above the jet-pipe to serve as a guard for the latter and effectually prevents a person from touching the pipe with his lips. From this construction it will be seen that water under pressure being admitted to the induction-conduit (and controlled, if desired, by any suitable form of pressure-regulator and valve) it will rise in a small stream or jet from the orifice $a'$ preferably to a point above the guard, where the person may obtain a drink by bending over the jet and allowing the stream to enter his mouth, the surplus water falling back into the eduction-conduit and being carried off through the latter.

It is preferable, though not essential, that the entrance end of the eduction-conduit B be in the form of a bowl extending continuously from the lower part up to the edge $b'$, which latter forms the guard for preventing access to the jet, as this arrangement prevents the water from being spilled or splashed on the floor, and we also prefer to screw the bowl upon the end of the eduction-conduit; but the essential characteristics of our device are present in a fountain in which the water issues in a jet directly from the induction-conduit and without passing through a cup or receptacle larger than the jet and liable to contain foreign substances and in which the entrance end of the eduction-conduit is large enough to receive and carry off the surplus water and is provided with a guard for the end of the jet to prevent the application of a person's lips thereto.

Further than as stated it is entirely immaterial what the form, proportions, or shape of the parts are or what means are provided for regulating the inlet or exit of the water, though one form of device embodying our invention, which has been used with success, is shown in Letters Patent No. 580,175, granted April 6, 1897, to Hampden Hyde.

We claim as our invention—

1. In a sanitary drinking-fountain, the combination with an unobstructed and freely-discharging eduction-conduit embodying at its entrance end an enlarged inlet for waste water, and a guard at the upper portion thereof, of a water-induction conduit having a vertical jet-orifice of lesser fluid capacity than the eduction-conduit isolated from surrounding walls or parts and from the bottom of the eduction-inlet, said orifice being located within and below the upper edge of the guard, and the induction and eduction conduits being arranged and adapted to permit the simultaneous inlet and exit of water, whereby the guard will prevent lip contact with the jet-orifice, and the falling water will pass into the eduction-conduit, substantially as described.

2. In a sanitary drinking-fountain, the combination with the induction-conduit provided with the small jet-orifice isolated from higher immediate surrounding walls or parts, of the unobstructed and freely-discharging eduction-conduit of greater capacity than the induction-conduit arranged around and below the jet-orifice, said induction and eduction conduits being arranged and operating to permit the simultaneous inlet and outlet of water, and a guard extending above the jet-orifice and preventing lip contact therewith, substantially as described.

3. In a sanitary drinking-fountain, the combination with the bowl and the unobstructed and freely-discharging eduction-conduit connected to the bottom thereof, of the inlet-conduit for water under pressure having the vertical jet-orifice of lesser fluid capacity than the eduction-conduit located within the bowl below its upper edge and isolated from immediate surrounding walls or parts, whereby water from said orifice may pass upwardly directly from the induction-conduit and fall below the jet-orifice, both said induction and eduction conduits being arranged and operating to permit the simultaneous inlet and outlet of water.

4. In a sanitary drinking-fountain, the combination with an unobstructed and freely-discharging eduction-conduit embodying a receptacle for waste water, of an induction-conduit having a lesser fluid capacity extending within the bowl, having the jet-orifice isolated from immediate surrounding parts and with substantially vertical external walls extending above the bottom of the receptacle and below the top thereof, both said induction and eduction conduits being arranged and adapted to permit the simultaneous inlet and outlet of water.

HAMPDEN HYDE.
JOHN BUCKLEY.

Witnesses:
E. A. PHILLIPS,
J. D. ARAUE.